United States Patent
Keller

(10) Patent No.: US 7,277,435 B2
(45) Date of Patent: Oct. 2, 2007

(54) METHOD FOR CARRYING OUT MONITORING IN PACKET-ORIENTED TELECOMMUNICATION AND DATA NETWORKS

(75) Inventor: Walter Keller, Ratingen (DE)

(73) Assignee: T-Mobile Deutschland GmbH, Bonn (DE)

( * ) Notice: Subject to any disclaimer, the term of this patent is extended or adjusted under 35 U.S.C. 154(b) by 742 days.

(21) Appl. No.: 10/467,267

(22) PCT Filed: Feb. 7, 2002

(86) PCT No.: PCT/DE02/00442

§ 371 (c)(1),
(2), (4) Date: Dec. 1, 2003

(87) PCT Pub. No.: WO02/065703

PCT Pub. Date: Aug. 22, 2002

(65) Prior Publication Data

US 2004/0120264 A1      Jun. 24, 2004

(30) Foreign Application Priority Data

Feb. 9, 2001   (DE)   ................................ 101 06 351

(51) Int. Cl.
*H04L 12/28*   (2006.01)

(52) U.S. Cl. ......................... 370/390; 370/252; 379/7; 379/35; 455/410

(58) Field of Classification Search ............... 370/252, 370/253, 390; 455/405, 410; 379/7, 35
See application file for complete search history.

(56) References Cited

U.S. PATENT DOCUMENTS 6,122,499 A * 9/2000 Magnusson ................. 455/405
6,141,548 A * 10/2000 Blanchard et al. .......... 455/428
6,754,834 B2 * 6/2004 Miettinen et al. ............... 726/3

* cited by examiner

*Primary Examiner*—Lee Nguyen
(74) *Attorney, Agent, or Firm*—Cooper & Dunham LLP

(57) ABSTRACT

The invention relates to a method for carrying out monitoring in packet-oriented telecommunication networks and data networks. The method makes it possible to reduce the processor performance required to carry out legal monitoring of telecommunication subscribers in switching nodes of packet-oriented telecommunication and data networks. To reduce the high number of comparably short data packets which must be respectively compared with the full list of subscriber connections which are to be monitored throughout the network and the computer power resulting therefrom required to carry out the tasks in each network node, the method is based on a reduced individual node list which is automatically generated and maintained and the number of individual verifications is kept to a minimum within a network node.

5 Claims, 2 Drawing Sheets

METHOD FOR CARRYING OUT MONITORING IN PACKET-ORIENTED TELECOMMUNICATION AND DATA NETWORKS

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

1. Field of the Invention

The invention relates to a method for carrying out monitoring in packet-oriented telecommunication and data networks.

2. Description of Related Art

The fundamental procedure for carrying out subscriber monitoring in telecommunication networks is described in ETSI GSM 03.33 (Tdoc SMG10 98 D047). In the Federal Republic of Germany, telecommunication services are monitored in line with the applicable legal provisions.

Packet-oriented telecommunication networks are cellular mobile radio networks based on the GSM standard using GPRS transmission methods (ETSI 03.60), for example. In contrast to line-conducted services, in this case the individual data packets are transmitted individually in the network using the TCP/IP protocol (in line with Internet Engineering Task Force IETF standard RFC 793/RFC 791), which means that the usual association between data transmission channel and communication subscriber does not exist.

The same method is applied on the public Internet. The same problems arise there.

When carrying out legal monitoring, particular problems are encountered with this type of transmission. The transmission channels are used by a large number of different customers with relatively short data packets in each case.

When monitoring is carried out, all data packets therefore need to be compared with a list of the subscribers which are to be actively monitored in order to filter out (to copy) those packets which can be attributed to the subscribers to be monitored in the transmission or reception direction.

Accordingly, the technical complexity rises as the bandwidth increases (more packets per unit time) and as the number of monitoring instances rises (longer list needing to be verified for each packet).

The components involved in switching (switching nodes, routers, gateways etc.) are equipped with microprocessor systems and their switching power is impaired quite considerably by the technical monitoring tasks. This is reflected in the costs because, as the monitoring tasks increase, more and also more powerful components need to be installed than would be the case for the pure switching tasks.

Since the monitoring tasks are among the legal requirements, these services have to be provided by the network operators, who need to bear the financial costs themselves.

It would therefore be of great commercial advantage if the processor complexity which needs to be provided for the legal monitoring tasks (Lawful Interception) could be reduced.

BRIEF SUMMARY OF THE INVENTION.

The present invention relates to a method for reducing the computational complexity (processors, memory, systems) required for carrying out the legal monitoring for communication subscribers in packet-oriented telecommunication and data networks, so as to save hardware and investment.

This object is achieved by providing a central administration device (ADMF) that manages all subscriber lines (subscribers) which are to be monitored and, regardless of the service-specific use authorization for the individual subscriber line, of the technical opportunity to use the terminals, the geographical sense and further properties which are relevant to network nodes or to subscribers, distributes all existing instances of monitoring, independently of network node, to all packet-data nodes in a telecommunication or data network, such that the central administration complexity can be minimized, reducing a networkwide standard monitoring list (ISNWL) contained in the ADMF to an individual list (ISNL) for specific network nodes by virtue of monitoring subscribers which cannot communicate in the network node in question at the present time and automatically deleting them from the ISNWL, reducing the ISNL or ISNWL to give a minimized individual list of subscribers which are to be observed (INS) by taking into account the maximum statistical traffic relations within the network node in comparison with the number of similar network nodes in the whole network and the maximum node performance, and using the reduced list (INS) as the list for the address comparison between each data packet which is to be conveyed and the monitoring list thereby minimizing the processing complexity.

BRIEF DESCRIPTION OF SEVERAL VIEWS OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE INVENTION

The invention is described below using one possible embodiment with example of the GPRS service in the GSM network in a schematic illustration of an exemplary embodiment with reference to the drawings. The drawings and their description reveal further features and advantages of the invention.

Figure 1:
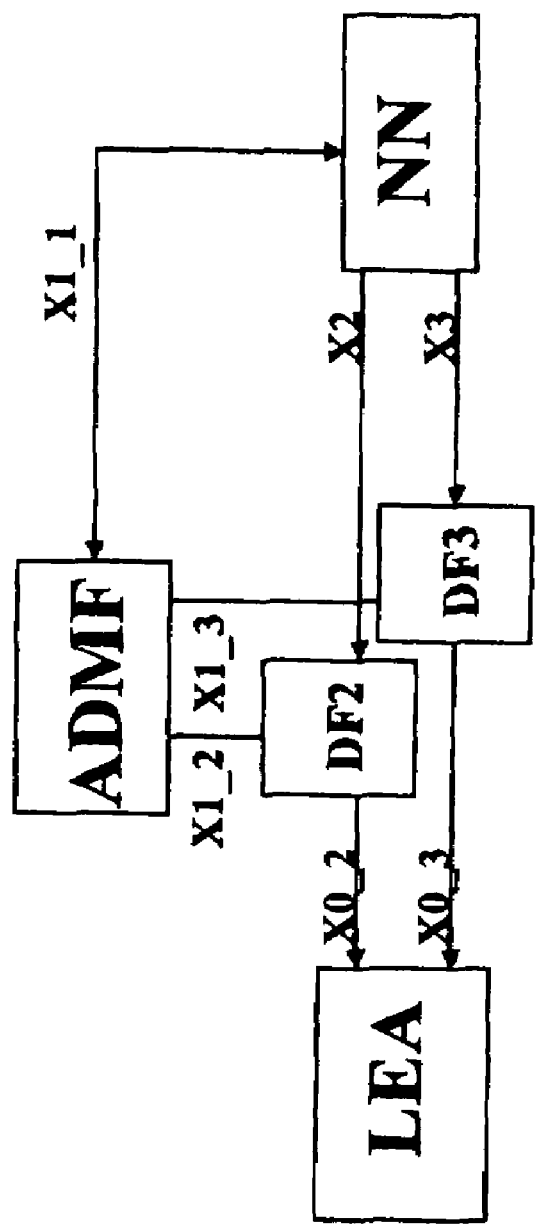
FIG. 1 shows a general procedure for monitoring subscriber lines in the mobile radio sector in accordance with the prior art.

FIG. 1 shows the general procedures for monitoring subscribers lines in the mobile radio sector (ETSI GSM 03.33) in line with prior art.

The monitoring is administered in the ADMF. The ADMF maintains, in particular, a list of the subscribers (subscriber call numbers) which are currently each subject to the measure. These subscriber data are transmitted to the network nodes in the form of the call numbers (in the GSM network, the IMSI or MSISDN), with each network node receiving all the call numbers as desired, since the administrator cannot continue data maintenance on the basis of the movement profile for the terminals in the network.

For data nodes, this can result in the performance problems described.

As an alternative to the IMSI/MSISDN, other data networks, for example the Internet, can involve the use of other subscriber identifiers, such as the TCP address (optionally in combination with the IP port number).

Figure 2:
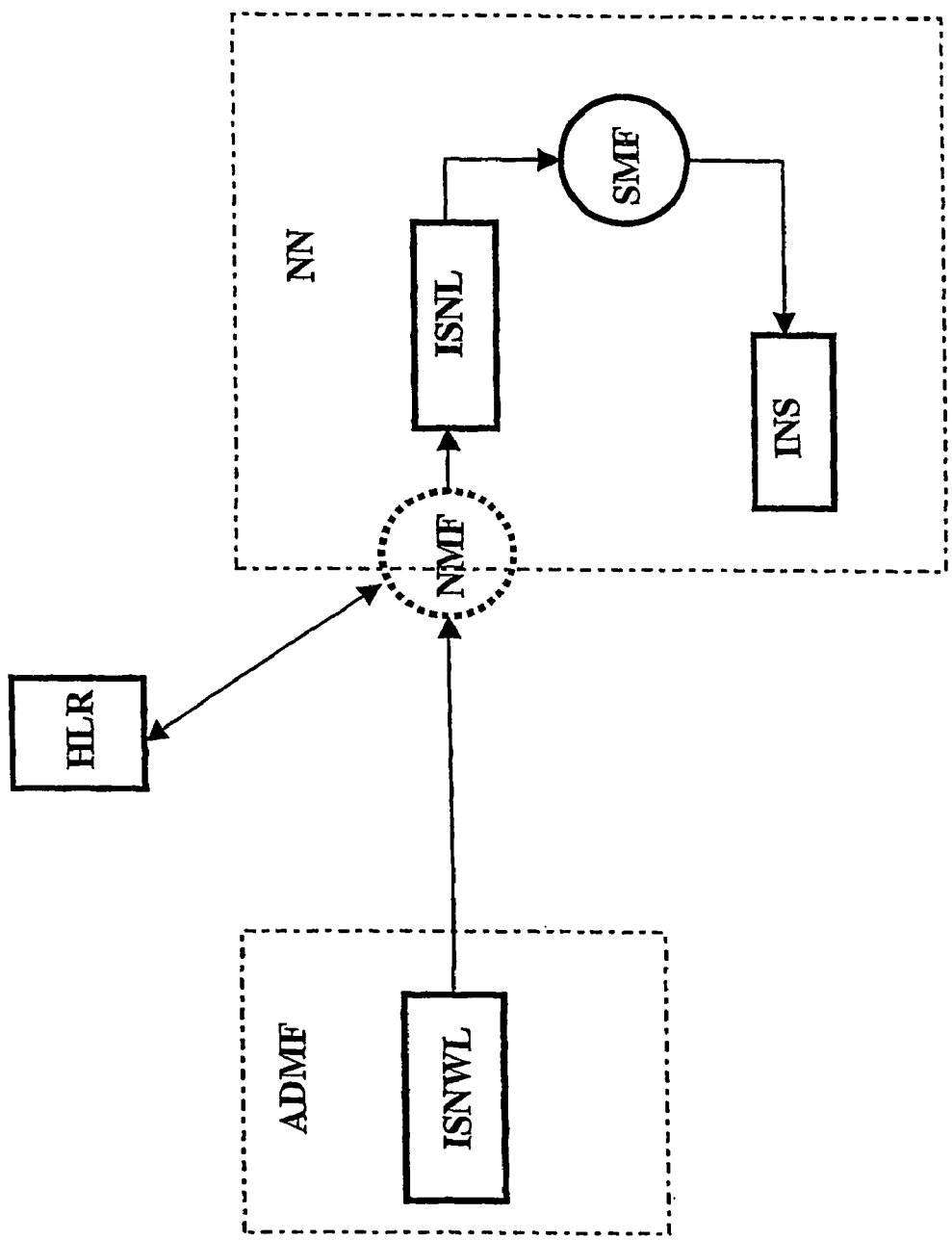
FIG. 2 shows a procedure for monitoring subscriber lines in the mobile radio sector in accordance with the present invention.

FIG. 2 shows an inventive procedure for eliminating the drawbacks. The central ADMF contains the total list of all active monitoring in the network (Interception Subscriber Network List ISNWL). These data are delivered cohesively or alternatively as single data items to the switching node (Network Node NN) in the packet data network. In this case, an optional filter function (Network Management Function NMF) is used to reduce the scope of the list. The NMF is preferably part of the NN, or a dedicated device which is responsible for a plurality of NNs. It is connected to the network node and, if required, to other network devices, such as the Home Location Register (HLR), in order to detect criteria for automatically reducing the list.

One suitable criterion exists, by way of example, if the customer in question cannot use the service provided in the NN on account of his technical equipment (no data terminal or the like) or on account of the contractual situation (no authorization to use data services), on account of the traffic relations (currently no data traffic/no context) or other criteria. Another reason can exist if the customer is currently visiting another network area, which means that his data traffic is not relevant to the present network node.

These and similar parameters can be used to reduce the ISNLW. The remaining data are stored as an Interception Subscriber Node List (ISNL) in the network node in the form of a database or in the form of a memory table and are respectively updated on the basis of the current level of the ISNWL and optionally other network information in the course of processing in the NMF.

The scope of the remaining list can still be very long, particularly if the optional NMF is not available. In this regard, an alternative or additional reduction method is used (Interception Node Sublist INS).

The list is created using the filter function (Sublist Management Function SMF) from the ISNL or alternatively from the ISNLW.

The criteria for the second reduction stage are provided by statistics and by the performance level of the node in question. The ISNWL applies nationwide/networkwide. From a statistical point of view, only that number of subscribers which can be ascertained by the number of similar nodes in the network can be affected within a single switching node.

A further boundary is provided by the computer capacity in the network node.

In addition to this there is the statistical circumstance that the number of instances of interception is small in comparison with the total number of subscribers. That is to say that the likelihood of a data packet actually needing to be doubled is very low.

This in turn means that, for each data packet, there is a high likelihood of the total list needing to be processed, since the likelihood of the relevant packet's addressee actually being stored in the list is very low. If all passing packets each need to have their addresses compared with the full networkwide interception list, this can require the full computation power, which means that it is no longer possible to transmit any kind of packet within the timeout values which are to be observed at the protocol end, and hence the traffic collapses. Accordingly, the list is reduced to a sensible level of entries in a second stage and is continually kept up to date.

Arriving data packets are subsequently now compared with the reduced list (in this case the INS) only in the address part. If the addressee in question is listed in the INS, the data need to be copied, and if this is not the case, it can be assumed with a very high degree of likelihood that the data packet is not one which needs to be monitored.

List of Abbreviations:
ADMF Administration Function (Legal Interception Control Center)
LEA Law Enforcement Agency (interested party)
DF2 Delivery Function 2 (Interception Related Information)
DF3 Delivery Function 3 (Interception Data Product)
NN Network Node
X Interface
ISNWL Interception Subscriber Network List
ISNL Interception Subscriber Node List
INS Interception Node Sublist
NMF Node Management Function
SMF Sublist Management Function
HLR Home Location Register

The invention claimed is:

1. A method for carrying out monitoring in packet-oriented telecommunication and data networks, comprising the steps of
providing a central administration device (ADMF) that manages all subscriber lines (subscribers) which are to be monitored and, regardless of the service-specific use authorization for the individual subscriber line, of the technical opportunity to use the terminals, the geographical sense and further properties which are relevant to network nodes or to subscribers, distributes all existing instances of monitoring, independently of network node, to all packet-data nodes in a telecommunication or data network, such that the central administration complexity can be minimized,
reducing a networkwide standard monitoring list (IS-NWL) contained in the ADMF to an individual list (ISNL) for specific network nodes by virtue of monitoring subscribers which cannot communicate in the network node in question at that time and automatically deleting them from the ISNWL, reducing the ISNL or ISNWL to give a minimized individual list of subscribers which are to be observed (INS) by taking into account the maximum statistical traffic relations within the network node in comparison with the number of similar network nodes in the whole network and the maximum node performance, and
using the reduced list (INS) as the list for the address comparison between each data packet which is to be conveyed and the monitoring list thereby minimizing the processing complexity.

2. The method as is claimed in claim 1, wherein a network-node-specific reduction in the ISNWL can be attained using a node-specific filter function (NMF), the NMF filter device being connected to network-node specific databases or call-processing tables and/or to the relevant network devices for the purpose of automatically detecting such subscribers on the ISNWL as cannot currently produce any traffic at all in the network node in question for contractual, technical, geographical, lack of current context, or other reasons, and can therefore be deleted from the ISNWL without a loss of security.

3. The method as claimed in claim 1, wherein a further optional reduction of entries on the ISNWL, or the list which has already been reduced on the basis of individual nodes (ISNL) can be achieved by virtue of a filter function (SMF) taking into account the statistical circumstances in the network (number of similar nodes) and the performance capability of the node in question (only a particular number of address comparisons implementable per packet) such that a remaining node-specific interception list (INS) is produced which is used to verify each data packet which passes.

4. The method as claimed in claim 1, wherein the presence of a network-node-specific list (INS) which has been produced as a result of the selection of subscribers which have an active traffic relationship (active data context) in instances when additional subscribers are likewise setting up an active traffic relationship (GPRS in line with ETSI 03.60, involves these instances of activation being compared with the standard monitoring list (ISNWL), since these subscribers cannot, by definition, yet be present in the reduced list at the time of activation, and the activation activity likewise needs to be observed, with this functionality having no time criticality, since it occurs less frequently than data packets and can be subject to a time delay.

5. The method as claimed in claim 1, wherein the filter functions NMF and SMF are continually in operation so that ultimately the node-related list ISNL or INS is always up to date.

* * * * *